(12) United States Patent
Lacoste (10) Patent No.: US 12,387,612 B2
(45) Date of Patent: Aug. 12, 2025

(54) DEVICE AND METHOD FOR CENTRALIZED MANAGEMENT OF AN AIRCRAFT FLIGHT MANAGEMENT SYSTEM

(71) Applicant: THALES, Courbevoie (FR)

(72) Inventor: Jean-Marc Lacoste, Merignac (FR)

(73) Assignee: THALES, Courbevoie (FR)

( * ) Notice: Subject to any disclaimer, the term of this patent is extended or adjusted under 35 U.S.C. 154(b) by 271 days.

(21) Appl. No.: 18/129,001

(22) Filed: Mar. 30, 2023

(65) Prior Publication Data
US 2023/0326355 A1 Oct. 12, 2023

(30) Foreign Application Priority Data

Apr. 12, 2022 (FR) ...................................... 2203344

(51) Int. Cl.
*G08G 5/50* (2025.01)
*B64D 43/00* (2006.01)
(Continued)

(52) U.S. Cl.
CPC ............... *G08G 5/50* (2025.01); *B64D 43/00* (2013.01); *G08G 5/30* (2025.01); *G08G 5/55* (2025.01)

(58) Field of Classification Search
CPC .. G08G 5/50; G08G 5/30; G08G 5/55; G08G 5/21; G08G 5/53; G08G 5/59; G08G 5/26; G08G 5/265; G08G 5/20; G08G 5/32; G08G 5/34; G08G 5/38; G08G 5/76; B64D 43/00; B64D 2045/0075; H10D 30/797; H10D 84/977; H10D 84/0126; G01C 23/00; G01C 21/00; G01C 21/005; G01C 23/005; H10H 29/39; G06F 3/04847; G06F 3/04842; G06F 3/04845; G06F 3/0484; G06F 2203/04803; G06F 3/0488; G06F 3/04817; G06F 3/0481; G06F 3/048; G06F 2203/04806; G05D 1/1062
See application file for complete search history.

(56) References Cited

U.S. PATENT DOCUMENTS 5,521,614 A * 5/1996 Kotha ..................... G09G 5/391
345/472
8,078,343 B2 * 12/2011 Ferreira ............... G01C 23/005
701/4
(Continued)

FOREIGN PATENT DOCUMENTS

EP 2 980 787 A1 2/2016

*Primary Examiner* — Fadey S. Jabr
*Assistant Examiner* — Faris Asim Shaikh
(74) *Attorney, Agent, or Firm* — BakerHostetler (57) ABSTRACT

A device for centralized management of an aircraft flight management system is provided, of the type of human-machine interface called FMD (for Flight Management Display), and which includes a plurality of functional components associated with human-machine interfaces. In particular, the device comprises a component and its 'waypoint list' interface in order to display the list of waypoints of a flight plan, a component and its 'flight-phase pages' interface in order to meet a need in respect of construction of the flight plan, and of following and editing of the latter, a component and its 'location and database management' interface, and a component and its 'system messages' interface, the system messages being those of the flight manage system.

17 Claims, 9 Drawing Sheets

(51) Int. Cl.
  *G08G 5/30* (2025.01)
  *G08G 5/55* (2025.01)

(56) References Cited

U.S. PATENT DOCUMENTS

| | | | | |
|---|---|---|---|---|
| 8,380,366 | B1 * | 2/2013 | Schulte | G01C 23/00 |
| | | | | 701/25 |
| 8,633,913 | B1 * | 1/2014 | Raghu | G06F 3/01 |
| | | | | 345/173 |
| 8,712,605 | B1 * | 4/2014 | Schulte | G01C 23/00 |
| | | | | 701/25 |
| 9,691,287 | B1 * | 6/2017 | Shapiro | G08G 5/21 |
| 2005/0049782 | A1 * | 3/2005 | Nakano | G01C 21/3647 |
| | | | | 701/455 |
| 2006/0197768 | A1 * | 9/2006 | Van Hook | G09G 5/363 |
| | | | | 345/546 |
| 2013/0268878 | A1 * | 10/2013 | Le Roux | G09B 9/08 |
| | | | | 715/772 |
| 2014/0156115 | A1 * | 6/2014 | Aymeric | G06F 3/0488 |
| | | | | 701/3 |
| 2014/0200748 | A1 * | 7/2014 | Porez | G05B 15/02 |
| | | | | 701/3 |
| 2016/0241767 | A1 * | 8/2016 | Cho | G06F 3/04842 |
| 2017/0024516 | A1 * | 1/2017 | Okabe | G16H 50/70 |
| 2017/0124734 | A1 * | 5/2017 | Gowda | G06T 11/60 |
| 2017/0129621 | A1 * | 5/2017 | Flotte | G08G 5/55 |
| 2017/0214889 | A1 * | 7/2017 | Maciejewski | H04N 7/185 |
| 2017/0275018 | A1 * | 9/2017 | Narra | G06Q 10/10 |
| 2019/0171337 | A1 * | 6/2019 | Perrin | G06F 3/0482 |
| 2020/0168103 | A1 * | 5/2020 | Holder | G08G 5/21 |
| 2024/0397193 | A1 * | 11/2024 | Kogo | G06F 3/0484 |

\* cited by examiner

DEVICE AND METHOD FOR CENTRALIZED MANAGEMENT OF AN AIRCRAFT FLIGHT MANAGEMENT SYSTEM

CROSS-REFERENCE TO RELATED APPLICATION

This application claims priority to foreign French patent application No. FR 2203344, filed on Apr. 12, 2022, the disclosure of which is incorporated by reference in its entirety.

FIELD OF THE INVENTION

The present invention relates to the field of flight management and more specifically relates to human-machine interfaces (HMI) suitable for flight management systems.

BACKGROUND

Management of a flight on-board an aircraft is increasingly complex because of the multiplication of the number of systems on-board the aircraft, these systems potentially being complex to parametrize and control during flight.

Flight management systems (FMS) offer pilots help during flight by providing information on piloting, navigation, estimates, fuel consumption, etc.

There are various flight management systems the capacities and the functionalities of which may vary greatly depending on the aircraft (helicopter, airliner, etc.), its uses (civil, military, etc.) and other factors (date of design especially).

The following functionalities or services are commonly available on an FMS:

Navigation database: The navigation database (NDB) contains all the information necessary to generate and follow the flight plan, this information especially includes:
  airways;
  waypoints;
  airports and their various runways;
  standard arrival routes (STAR) and standard instrument departure routes (SID);
  other information regarding installations on the ground.

Flight plan: The pilot has a human-machine interface allowing him, before departure, to enter his flight plan. The flight plan is made up of a sequence of waypoints the structure of which is defined by reglementary standards. These waypoints are connected by legs, which define the various means of flying between two waypoints.

Path: Based on the flight plan, the FMS is able to compute the path to be followed, which will be displayed on display screens with an estimation of any data liable to be useful to the pilot during the flight, such as times of arrival at the various waypoints of the flight plan, estimation of the amount of fuel there will be remaining, etc.

Guidance: Some FMS include a guidance system. Once a path has been computed, the pilot is able to choose to follow the latter manually or automatically (in the latter case the FMS is coupled to an autopilot which then pilots the aeroplane depending on guidance orders sent by the FMS). In both cases, the guidance system delivers the information required to follow this path (speeds, angles, altitude, speed to be reached, etc.), or may even take responsibility for some of the actions to be performed.

Location: In flight, one of the main responsibilities of a flight management system consists in accurately determining the location of the aircraft. To do this, the system generally has access to several sources of radio-navigation data and positioning systems and sensors, such as VOR, GPS, DME, IRS for example.

The FMS is therefore a key element of the avionics of a modern aeroplane, its task being to decrease the amount of work the flight crew has to do to plan flights, manage performing, pilot the aeroplane, measure flight parameters, and navigate. Thus, the FMS is able to control the entirety of a flight, from take-off to landing, all the required computations being performed by a flight management computer (FMC).

The results of the computations performed by the computer of the FMS and flight information are generally rendered on display systems coupled to the FMS, in order to convert the data into readable information.

Data entered by pilots (preparation of the flight plan, insertion of data during flight, flight tracking, page selection, etc.) are input via human-machine interfaces (HMI), which are generally located on the central console, and which may correspond to one or more screens potentially equipped with keyboards, buttons, voice commands, etc.

At the present time, in most existing aeroplanes, the HMI of an FMS is a multifunctional control and display unit (MCDU) that allows the flight crew to input data into the flight management system and to read information communicated by the flight management system. In state-of-the-art aeroplanes, this unit has been replaced by a unit designated 'the keyboard cursor control unit' (KCCU), which allows pilots to interact with the flight management system in a relatively comparable way to how one interacts with a desktop computer, especially through menus and use of a cursor to interact with the interface and navigate the menus.

Figure 1:
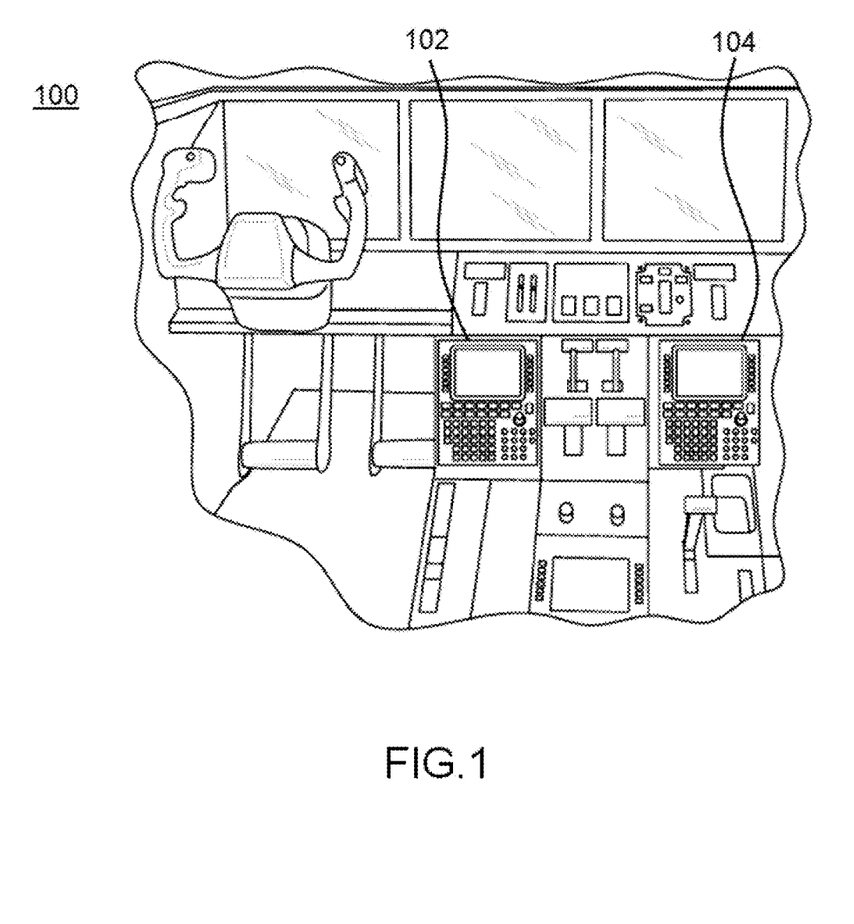
FIG. 1 is a view of the interior of a cockpit equipped with multifunctional control and display units according to the prior art.

FIG. 1, sourced from patent application EP 2 980 787 A1, illustrates the interior of a cockpit 100 equipped with a flight management system providing conventional functions to which a pilot and/or co-pilot are able to access via one or more multifunctional control and display units (MCDU) 102 and/104, by manipulating physical keys on a keyboard, to obtain a flight characteristic or to navigate to a function or command of the FMS, for example so as to obtain an airport identification code, a radio frequency, edit a flight plan, etc. To obtain a sought characteristic or to access a function or command of the FMS, a pilot must navigate a set of menus and/or sub-menus using the keyboard, and must press a button a certain number of times and/or perform other manual operations using the keyboard. Improved versions of the MCDU having touch screens with a virtual keyboard and/or voice commands. However, the process of navigation, which involves a number of steps, is time-consuming and requires concentration, in particular when the pilot is not familiar with the sought characteristic and/or function. In addition, the difficulty associated with locating the desired characteristic or function may be amplified in certain circumstances (landing for example), this giving rise to a high or fluctuating workload.

Although these HMI allow all the functionalities of an FMS to be controlled and the latter to be parametrized, the paradigm of this component is inconsistent with new-generation cockpits, not merely in respect of appearance and usability, but also in respect of the grouping of information. Specifically, these KCCU or MCDU units are fairly complex ways of remotely interacting with a system that is itself complex, i.e. the FMS, and in addition the operations that the pilot is able to carry out with such units are themselves quite complex.

In known prior-art HMI, all the available functions are siloed. Known MCDU or KCCU have an architecture organized into various sub-groups corresponding to various capacities of the system. The pilot, to obtain contextual information, must navigate a 'vertical' tree through various menus. Starting from a first menu, he must descend to a second-level menu, then a third- and fourth-level menu to access required information or to perform a required action, while having to remember the information contained in prior menus. Accessing information is therefore neither easy, nor intuitive, and places an additional cognitive load on the pilot.

At the present time, a number of manufacturers are working to simplify management of FMS, in order to increase the ease with which information and executable commands may be accessed. The suggested solutions are similar to MCDU or KCCU interfaces displaying a flight plan with various waypoints, in a 'waypoint list' format or in a 'timeline' format, which allow certain future events to be anticipated, but which do not cover all the actions possible in respect of management of a flight plan. Prior-art solutions remain incomplete.

In addition, these interfaces offer fairly little interactivity in respect of execution of commands of the FMS and of changes of page, requiring the user to execute actions in a procedural manner, while having to remember the context displayed in a preceding menu. Specifically, the FMS equipment of modern aeroplanes is quite complex to use—it provides an enormous amount of information and it is possible to execute many commands, in general about 200 different commands.

Moreover, the architectures that have been developed up to now are not compatible with use in modern cockpits where it is necessary to be able to provide assistance with anticipation of time constraints during a flight. Aeroplane and helicopter pilots have confirmed the need, in cockpits, for a representation of the successive steps of a flight not only during actions performed to prepare and verify the flight plan, but also to allow future constraints to be monitored and anticipated during flight.

Thus, at the present time, no unit-like device makes it possible, in a centralized manner, via the same interface, to manage:
end-to-end creation of a flight plan;
functions allowing a flight plan to be followed, edited and revised at any moment during the flight;
anticipation of constraints and procedures of a flight over the short, medium and long term;
management of flight-phase pages; and
configuration of the flight management system (location, database, messages and statuses).

Furthermore, no device makes it possible to access and control all of the capacities of a flight management system, while preserving, at a first interface level, the availability (in terms of display or of access) of the current context, in particular during use of various menus and sub-menus.

In addition, in existing solutions, the interface used to access the functionalities of an FMS is a component isolated from other interfaces present in a cockpit, and there is no interactional continuity between the various applications supported by these interfaces. For example, there is no continuity between an action actuated via an MCDU or KCCU interface and an interface implementing an application displaying an NSD format (NSD standing for Navigation System Display) or an interface implementing an application displaying a VSD format (VSD standing for Vertical System Display).

Thus, there is a need to provide pilots with a solution allowing centralized management of all the parameters of construction, editing, revision and display of a flight plan that is computed by one or more systems and depending on multiple parameters and constraints.

Such a solution must allow all the available functions to be viewed simply, and must provide the ability to control a flight management system intuitively.

SUMMARY OF THE INVENTION

The present invention meets the need to display, at a first interface level, all the information required to follow a flight, depending on the current context and situation of a flight, and all the information required to anticipate actions. The present invention meets the need to simplify access, by limiting the number of user operations, to all the capacities of a flight management system.

One subject of the present invention is a HMI device (HMI standing for Human-Machine Interface), referred to as the FMD device below (FMD standing for Flight Management Display). The FMD device provided allows centralized control of a flight mission computed by a flight management system.

Advantageously, the FMD device of the present invention has a design centred on usability, and comprises a plurality of components with a view to allowing centralized contextual management of a flight management system (FMS).

The FMD device synthesizes a set of functionalities and provides contextual functional groupings corresponding to the needs of the user during various flight phases. For example, for a given flight procedure, the pilot will have available to him all the information required to perform this procedure at the first level of the interface, and will not be obliged to pass from page to page in order to bring the procedure to fruition.

Advantageously, essential information is always present at the first level, and all the capacities of the flight management system are available at a single navigation sub-level.

The FMD interface may be delivered via one or more screens of an aircraft cockpit.

The device of the invention comprises a plurality of functional components associated with human-machine interfaces, for rendition of computations. In particular, the device comprises a component and its 'waypoint list' interface in order to display the list of waypoints of a flight plan, a component and its 'flight-phase pages' interface in order to meet a need in respect of construction of the flight plan, and of following and editing of the latter, a component and its 'location and database management' interface, and a component and its 'system messages' interface, the system messages being those of the flight manage system.

The waypoint list component offers, through its interface, a sequential representation of waypoint information and of tasks to be carried out throughout a flight, at various levels of detail, and allows interaction with future events. Advantageously, the waypoint list interface provides a new point of view on the flight mission, the aim of which is to assist with anticipation of navigation time constraints.

The waypoint list component is used conjointly with the flight-phase pages component. Use of these two sub-components allows a flight plane to be very easily constructed and edited end to end.

The other sub-components of the device of the invention—location and database management; system messages—are configured to manage functions used to configure the flight management system.

Advantageously, the present invention allows difficulty with comprehension and use of an FMS to be solved, by giving the user access to essential information at the first FMD HMI level, in a synthetic view that provides the ability to navigate through all the capacities of the flight management system contextually in only two navigation sub-levels, this being referred to as horizontal navigation.

The invention may preferably be used in relation with a flight management system (FMS). It may be easily customized to various types of flight management system (including systems for pilotless vehicles). The invention may be generalized to use in relation with any ground- or sea-vehicle path management system. Thus, the present invention is applicable to any piloted aircraft, in flight or on the ground, equipped with a path management system.

To obtain the sought results, a device for centralized management of an aircraft flight management system is provided, this device comprising: a data-processing module having a processor configured to implement code instructions allowing data of a flight management system of an aircraft to be processed; and a display module that interacts with the data-processing module.

The display module is configured to display on a screen of the aircraft:
- in a first region of the screen, activatable symbols representing operations for management of the flight plan of the aircraft and operations for configuration of the flight management system of the aircraft;
- in a second region of the screen, activatable symbols representing contextual navigation functions associated with an activated symbol in the first region; and
- in a third region of the screen, a sequential representation of optionally activatable symbols representing information, called first-level information, on the active flight plan of the aircraft, said first-level information including at least a list of successive waypoints of the flight plan, from the current position of the aircraft to the destination point, of immediate actions relating to the current position of the aircraft, and of future actions relating to positions of the aircraft at the successive waypoints.

The device of the invention is characterized in that the display module is configured to:
- display, on an interaction with an activatable symbol of the third region, optionally activatable symbols in a fourth region of the screen, said activatable symbols being representative of navigation commands or functions regarding said activated symbol, said functions or commands being determined by the current context of the aircraft; and
- display, on an interaction with an activatable symbol of the fourth region, an editing menu in a fifth region of the screen, said editing menu allowing data to be input in respect of the function or command selected via interaction with said symbol; and is such that the display area for said fourth region and the display area for said fifth region are determined so that the respective displays are generated in the perimeter of said third region while preserving, in this perimeter, a display of some first-level information of the sequential representation.

The invention provides a number of embodiments.

According to one particular aspect of the invention, the display module comprises a module configured to display, in the second region of the screen, activatable symbols representing various flight phases of the aircraft, and to display, in the third region of the screen, a sequential representation of the waypoints of the flight plan of the aircraft, when an activatable symbol representing the flight plan of the aircraft is activated.

According to one particular aspect of the invention, the display module comprises a module configured to compute a new display perimeter of the third region on an interaction with an activatable symbol of the third region.

According to one particular aspect of the invention, the display module is configured to compute a display area of the third region according to three different display formats.

According to one particular aspect of the invention, the display module is configured to compute a display area of the third region according to three different display formats.

According to one particular aspect of the invention, the display module is configured to compute a display area of the third region allowing full display in a format referred to as the 'full 660 px' format displaying all of the functionalities for managing the flight management system.

According to one particular aspect of the invention, the display module is configured to compute a display area of the third region allowing display in a panel format referred to as the 'panel 400 px' format allowing combined display of activatable symbols on the same screen with a 2D map.

According to one particular aspect of the invention, the display module is configured to compute a display area of the third region allowing display of non-activatable symbols in a strip format referred to as the 'strip 180 px' format allowing a display of small size.

According to one particular aspect of the invention, the display module is configured to display the fourth region to the right or to the left of the display area preserved for first-level information.

According to one particular aspect of the invention, the editing menu especially allows a new waypoint or a new procedure to be added, or a constraint on a point of the flight plan to be edited.

Another subject of the invention is an electronic system for displaying a flight mission of an aircraft, configured to render, on the same screen:
- in a first region, what is referred to as a cartographic display of a 2D map with geo-referenced waypoints of the flight plan of the aircraft;
- in a second region, what is referred to as a vertical display of a vertical cross-sectional view of the terrain on the flight plan of the aircraft; and
- in a third region, a display of the flight plan obtained by the display module of the device according to the invention.

According to one embodiment, the device according to the invention comprises a module configured to determine an interaction with the first or second region and to actuate display of a corresponding editing menu in the third region.

One subject of the invention also addresses an aircraft, especially a helicopter, comprising a flight management system and a device according to the invention.

The invention also covers a method for central management of an aircraft flight management system. The method comprises steps implemented:
- by a data-processing module having a processor configured to implement code instructions allowing data of a flight management system of an aircraft to be processed; and
- by a display module that interacts with the data-processing module, the display module making it possible to display on a screen of the aircraft:
  - in a first region of the screen, activatable symbols representing operations for management of the flight plan of the aircraft and operations for configuration of the flight management system of the aircraft;

in a second region of the screen, activatable symbols representing contextual navigation functions associated with an activated symbol in the first region; and in a third region of the screen, a sequential representation of optionally activatable symbols representing information, called first-level information, on the active flight plan of the aircraft, said first-level information including at least a list of successive waypoints of the flight plan, from the current position of the aircraft to the destination point, of immediate actions relating to the current position of the aircraft, and of future actions relating to positions of the aircraft at the successive waypoints.

The steps of the method consist in:

detecting an interaction with an activatable symbol of the third region;

determining a display area in a fourth region of the screen that is in the perimeter of said third region, while preserving in this perimeter a display of some first-level information of the sequential representation;

displaying optionally activatable symbols in the fourth region of the screen, said activatable symbols being representative of navigation commands or functions regarding said activated symbol, said functions or commands being determined by the current context of the aircraft;

detecting an interaction with an activatable symbol of the fourth region;

determining a display area in a fifth region of the screen that is in the perimeter of said third region, while preserving in this perimeter a display of some first-level information of the sequential representation;

displaying an editing menu in a fifth region of the screen, said editing menu allowing data to be input in respect of the function or command selected via interaction with said symbol.

The invention also addresses a computer program comprising code instructions that, when the program is executed by a computer, lead the latter to implement the method for assisting with guiding an aircraft of the invention.

BRIEF DESCRIPTION OF THE DRAWINGS

Other features and advantages of the present invention will become more clearly apparent on reading the following description with reference to the following drawings.

DETAILED DESCRIPTION

Figure 2:
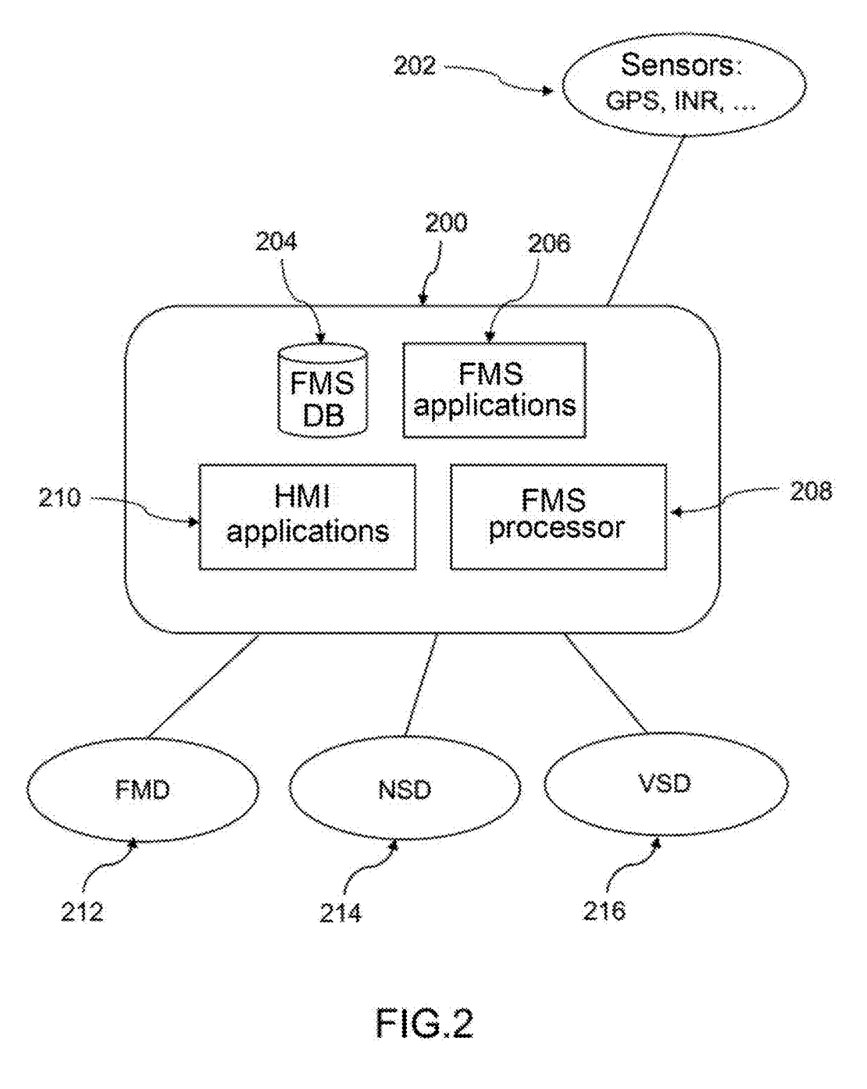
FIG. 2 illustrates one implementation of the device of the invention in the context of centralized management of a flight management system (FMS)

FIG. 2 illustrates one implementation of the device of the invention in the context of centralized management of a flight management system (FMS). In this embodiment, components of the device of the invention are integrated as an FMD application 212 of a general flight management system 200 already installed on-board an aircraft.

Although there are various flight management systems, the capacities and functionalities of which may vary depending on the targeted aircraft (helicopter, airliner, etc.), they are generally coupled to various sensors 202 (GPS, INR, etc.) allowing information relating to the current environment of the aircraft to be gathered.

The flight management system also comprises various databases 204 and functional modules 206 allowing routine functions of a flight manager to be carried out.

In the example of FIG. 2, the computations for the various functional modules 206, and the computations for the various HMI applications 210 (FMD, NSD, VSD), are performed by one or more processors 208 of the execution platform of the FMS.

In one variant of embodiment, the computations carried out for the centralized FMD management application of the invention are assigned to a specific partition of a hardware platform specific to the avionics but different from that of the FMS, such as for example a platform of an electronic flight bag (EFB).

The various HMI applications 210 supported by the flight management system 200 may comprise a centralized FMD management application, an NSD application (NSD standing for navigation system display), and a VSD terrain-cross-section application (VSD standing for vertical system display). The computations realized for each application may be rendered in the form of a respective display—FMD 212; NSD 214; VSD 216—on separate screens or on the same screen.

The device of the invention allows, via implementation of method steps, a flight mission to be managed on-board an aircraft by offering, from one and the same interface, referred to as the flight management display (FMD), functions allowing a flight plan to be constructed, edited and revised, functions allowing location to be managed, and the database of the FMS to be managed.

The FMD device has a design the appearance and interactivity of which are consistent with the concept of modern cockpits like the avionic solution "Thales FlytX" of the applicant.

The FMD device of the invention replaces solutions of MCDU or KCCU type, and is integrated into a modern aircraft cockpit solution.

Advantageously, the FMD interface has a design centred on usability and employs horizontal navigation, which makes it easier for the user to obtain a general understanding of the flight management system, and which allows the number of actions required to access any capacity of the system to be decreased.

The FMD device of the invention allows construction and management of the flight plan (including management of flight-phase pages) in a first-level menu FPLN (FPLN standing for flight plan), and includes management and parametrization of the FMS in other first-level menus, namely the menus 'Data', 'Position' and 'Message&Stats'. Thus, a plurality of elements or components are grouped together in a first-level display in the FMD, these especially including:

The 'flight plan' component with:
an active flight plan, which corresponds to the flight mission;
a temporary flight plan, which is generated after editing of the active flight plan;
one or more secondary flight plans, which are alternatives to the active flight plan and which are selectable at any time.

The 'flight phases' component. The editing panels of the various flight phases are 'GROUND, DEPART, CRUISE, ARRIVAL'.

The 'data' component, for managing the database part and saving user data.

The 'location' component, for managing the position sensors of the aircraft.

The 'MSG & stats' component, for managing messages and various items of information and the status of the FMS.

Figure 3A:
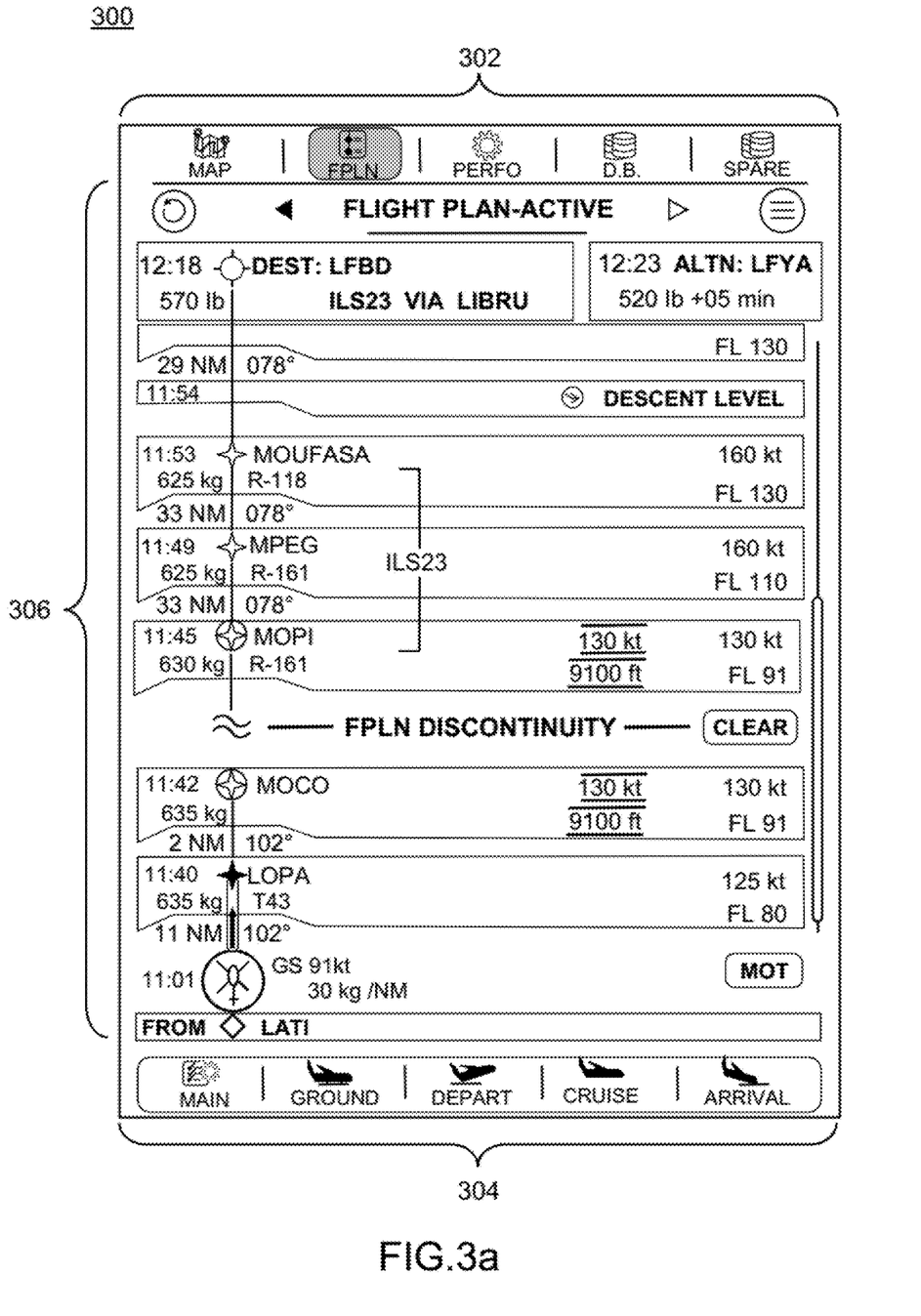
FIGS. 3a to 3c illustrate three display formats for the FMD display interface of the invention, in the example of a sequential display of a waypoint list.
Figure 3B:
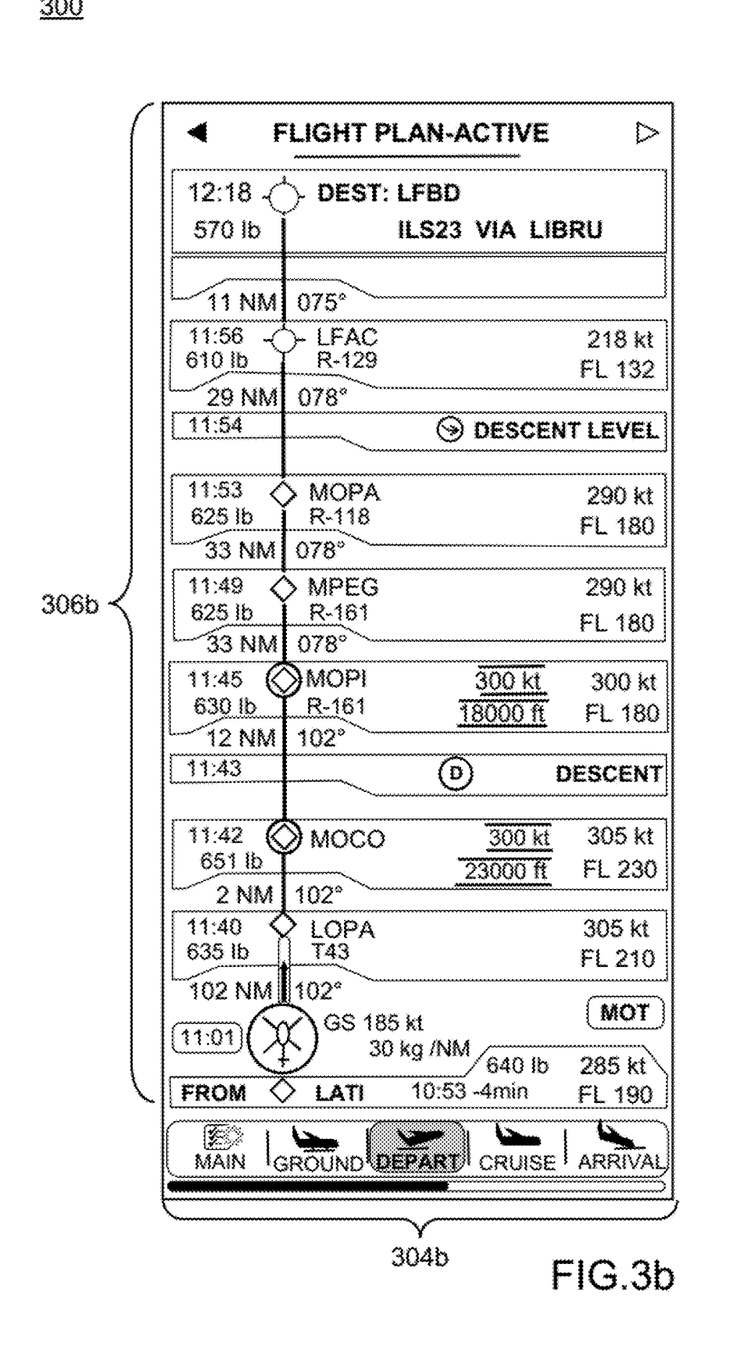
Figure 3C:
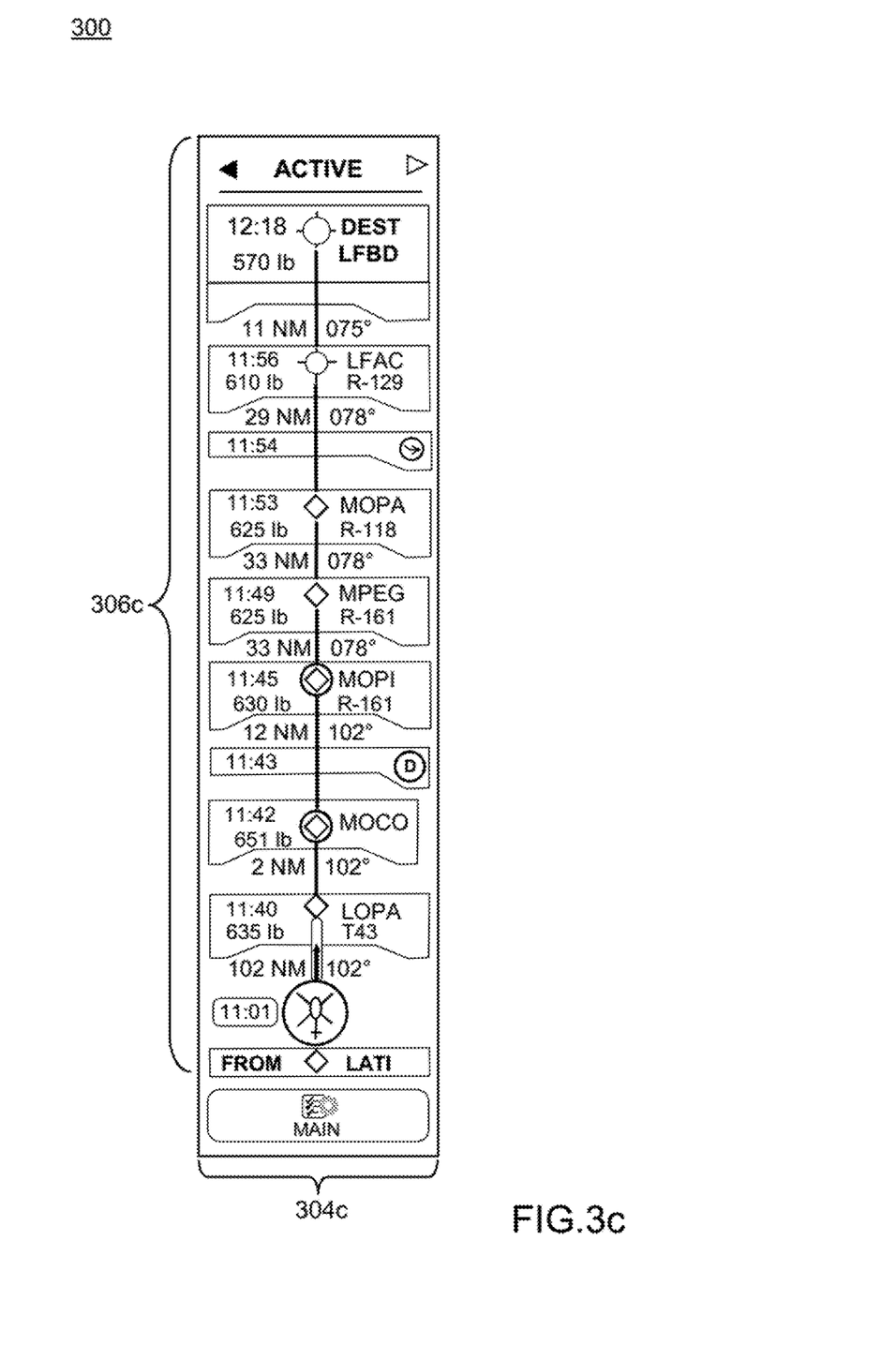

FIGS. 3a to 3c illustrate three display formats of the waypoint list of the 'flight plan' component of the FMD interface of the invention.

It will be noted that FIGS. 3 to 6 are simplified but real representations of displays for aircraft cockpit screens, comprising terms, acronyms and abbreviations well known to those skilled in the art in question of avionics.

FIG. 3a shows a view of the FMD interface with the waypoint list in the full display format referred to as the 'full 660 px'; FIG. 3b shows a view of the FMD interface in the panel display format referred to as the 'panel 400 px'; and FIG. 3c shows a view of the FMD interface in the small strip display format referred to as the 'strip 180 px'.

Figure 6:
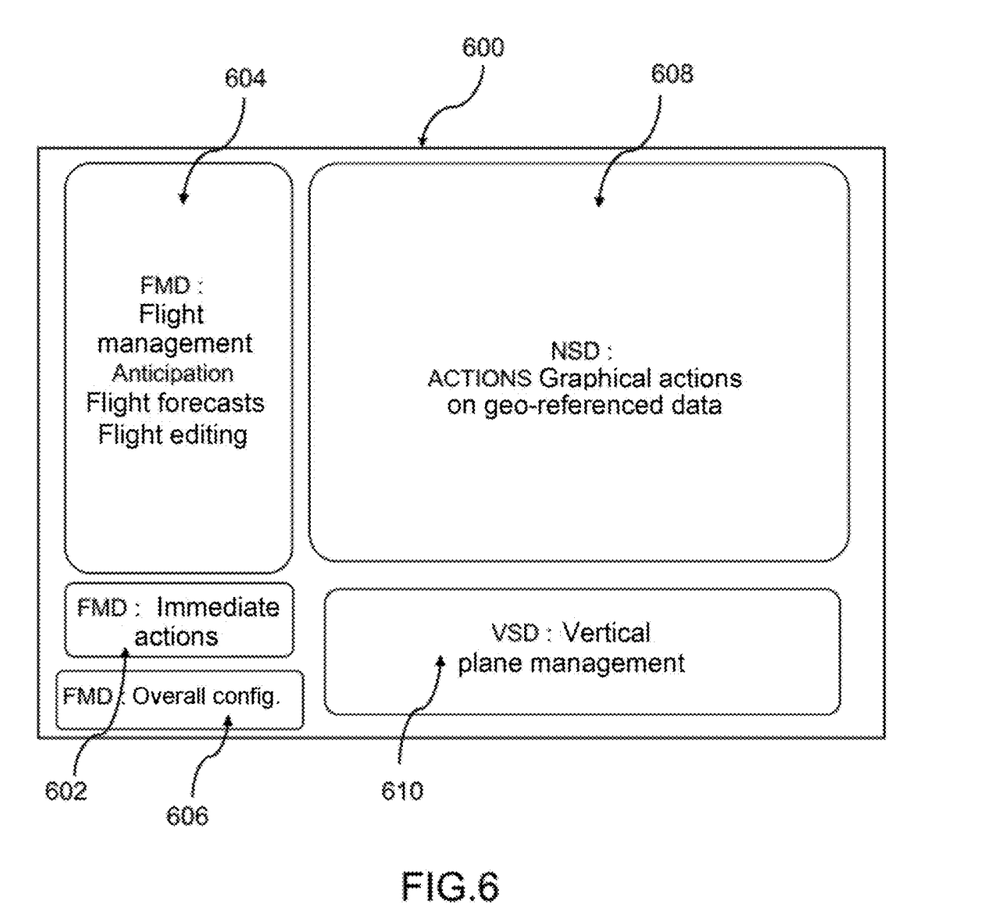

The three display formats of the FMD HMI are accessible at any time. Only the full format (FIG. 3a) includes all the functionalities of the device of the invention. The two other formats, the panel format (FIG. 3b) and small format (FIG. 3c), include only the main functions of management of the flight plan and of the flight-phase pages. These two functions are intended to be displayed in addition to the 2D map HMI of the navigation system display NSD and/or the terrain-cross-section HMI of the vertical system display VSD (FIG. 6).

The differences between the three display formats are:
'full 660 px' (FIG. 3a): is a format displaying all of the functionalities for managing the FMS, and able to be displayed on any screen in a cockpit;
'panel 400 px' (FIG. 3b): is a format that may be displayed in addition to a 2D map and/or a VSD cross section, while allowing each and every interaction on the flight plan. This format may be actuated via an interaction with the main mission HMI and be displayed to the right or left of a 2D map;
'strip 180 px' (FIG. 3c): is a small format that preserves sequential visualization of the flight plan in its entirety, while allowing scrolling (activated by cursor or touch or voice) upward or downward. This small format does not allow the flight plan to be edited, and the user must switch to a panel format or a full format to perform this operation.

The ability to display the waypoint list in a panel or strip format allows the pilot to have a synthetic overview of all the properties of his flight over time and thus to monitor the consistency of the whole conjointly with a 2D point of view and/or a vertical VSD view displayed on the same screen.

Specifically, the design and operation of the FMD interface advantageously allow interactions with a 2D map to be decreased so that most of the management of the flight plan is achieved via interaction with the waypoint list component, which is a virtual control panel (VCP). Thus, interactions with a 2D map are limited to actions of positioning geo-referenced points.

Returning to FIG. 3a, the primary FMD interface 300 is composed of three display regions or areas, shown from top to bottom, and which are:

A first region 302 that allows, via activatable symbols, operations regarding management of the flight plan and operations regarding parametrization and configuration of the FMS system (Data, Position, Message&Stats) to be accessed at any time. In one embodiment, this region is located in a band at the top of the FMD HMI.

A second contextual region 304, which displays activatable symbols representing navigation functions, which are associated with an activated symbol in the first region, and which correspond to a sub-menu of an active selection in the first menu. For example, if the flight plan symbol (FLPN) is selected in the first region 302, the second region 304 displays the various flight phases (GROUND, DEPART, CRUISE, ARRIVAL). In the second region 304 the display is thus divided into sub-menus of symbols selectable by the user. In one embodiment, this region is located in a band at the bottom of the FMD HMI.

A third region 306 that may either display read-only information without interactivity, or display activatable symbols relating to a symbol activated in the first region. In the example of selection of the flight plan (FPLN), a sequential representation of the waypoint list is displayed with optionally activatable symbols representing information, referred to as first-level information, on the active flight plan of the aircraft. The first-level information includes at least the list of the successive waypoints of the flight plan, from the current position of the aircraft (represented by a symbol or by a picture aircraft) to the destination point (point DEST'). The sequential display may also include immediate actions to be carried out, these immediate actions being related to the current position of the aircraft, and future actions to be carried out, these future actions being related to positions of the aircraft at the successive waypoints of the flight plan. In one embodiment, this region is located at the centre of the FMD HMI so as to occupy the display area available between the top band 302 and the bottom band 304.

In one embodiment, the waypoint list is navigated from bottom to top, a picture aircraft pointing and moving toward the top of the screen by scrolling through the successive waypoints of the flight plan.

Thus, at the first read-out level of the HMI, without any particular action, the FMD interface allows events to be anticipated during flight. The pilot sees the following information:
right at the bottom of the sequential representation, the symbol 'FROM', which indicates the preceding waypoint, with predictions that were made for this waypoint in order to allow him to make a forecast/effective comparison;
the picture aircraft with the current time, the status of the current leg as indicated by its colour (i.e. preview, live or engaged), the length and orientation of the leg and the progress made advancing therethrough (in the example of FIG. 3a, it is shown that the aircraft is a little past half way);

each waypoint with the (relative or absolute) time it will be reached, its name, its status, the associated airway, and predictions (speed, level, amount of fuel). It is possible to click on each waypoint symbol to obtain complementary information or to carry out actions;

each leg with its length, its orientation and its status;

flight-plan pseudonyms in the corresponding leg. It is possible to click on each pseudonym symbol to obtain complementary information;

in-flight indications in the corresponding leg (indication of a frequency change for example);

the destination (DEST);

an alternate (ALTN).

Figure 4:
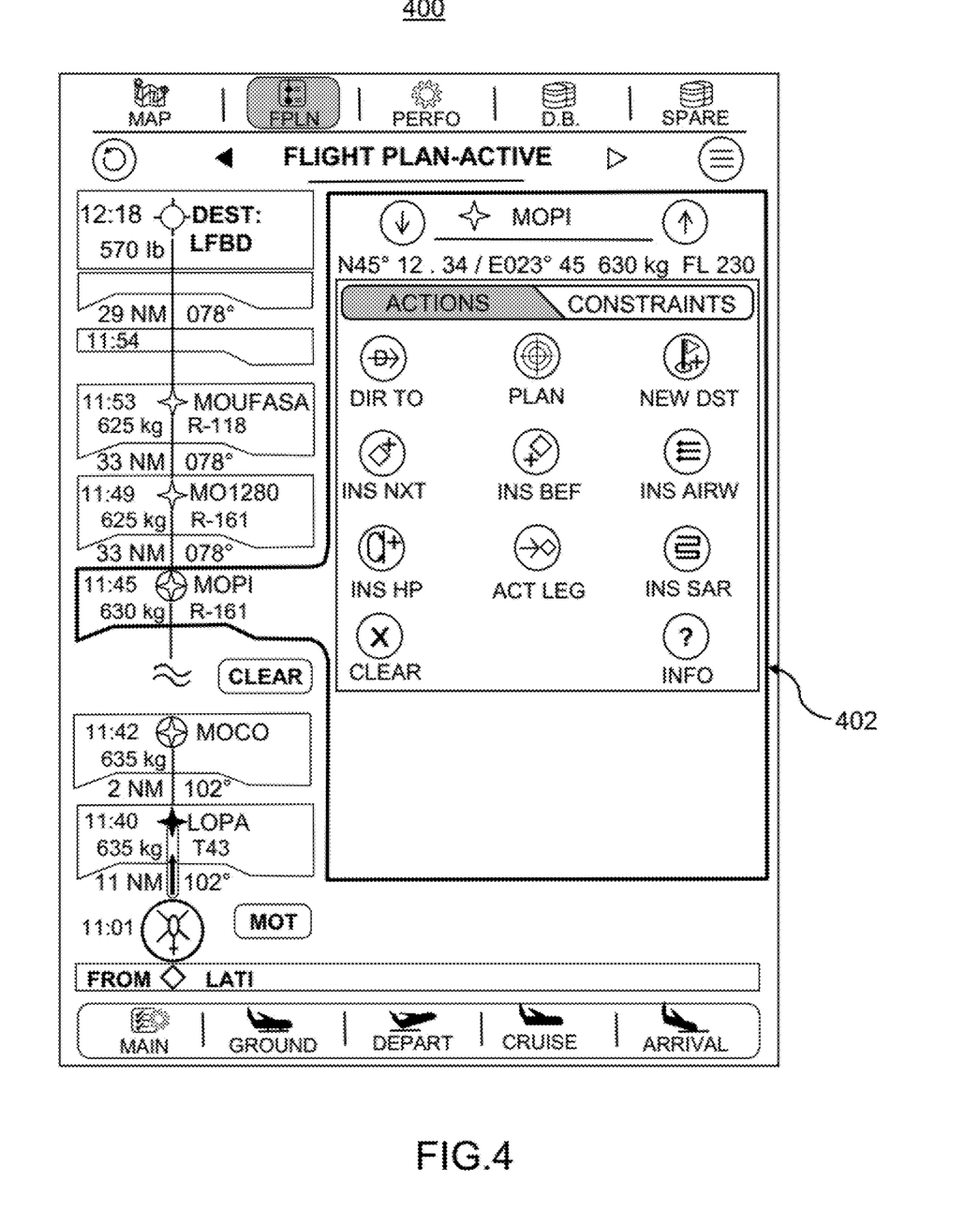
FIG. 4 illustrates an example of display, on the FMD interface of the invention, of a first horizontal-navigation sub-level actuated through interaction with the sequential display interface of a waypoint list.
Figure 5A:
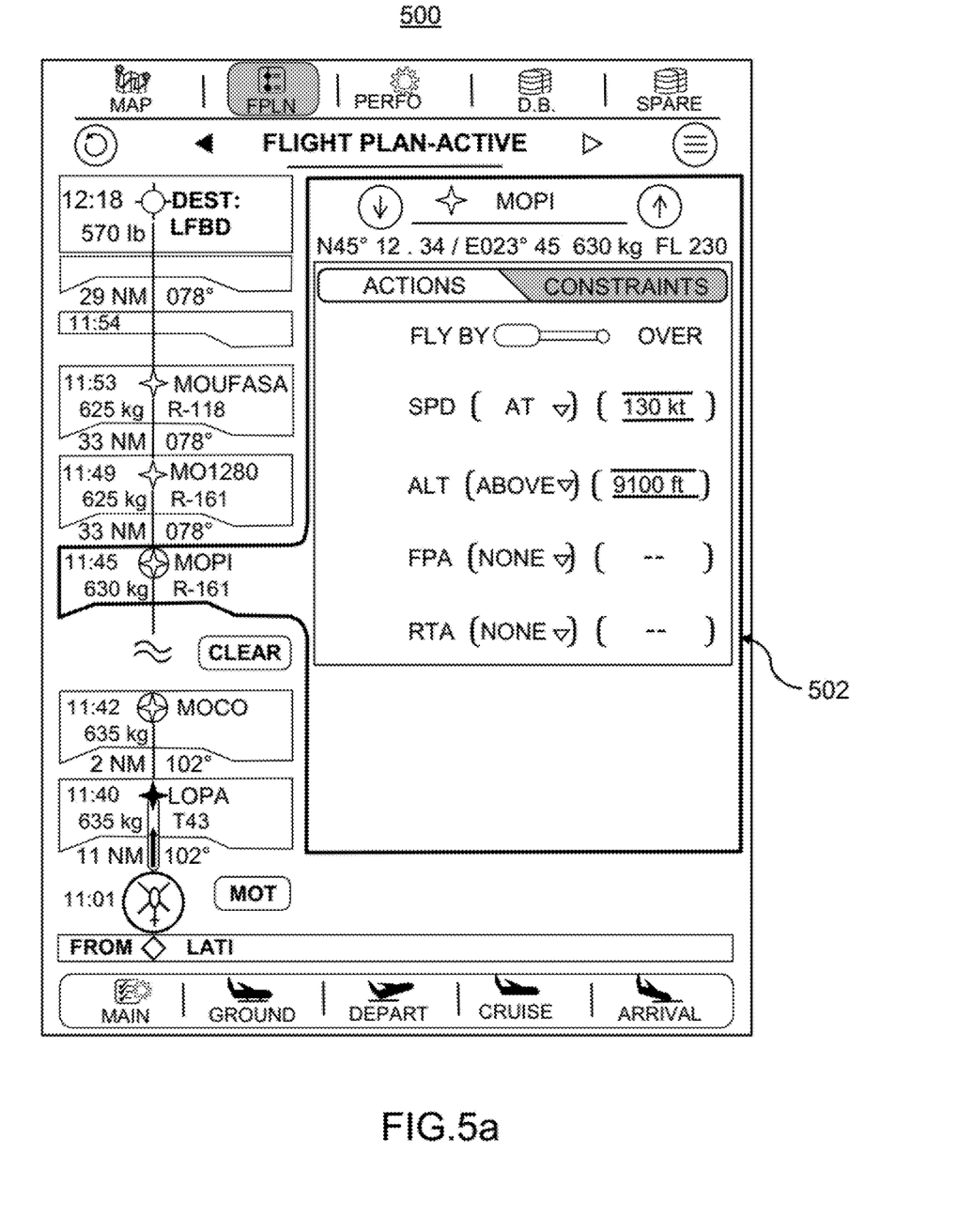
FIG. 5a illustrates another example of display, on the FMD interface of the invention, of a first horizontal-navigation sub-level actuated through interaction with the sequential display interface of a waypoint list.

Thus, for activatable symbols, selection of a symbol allows the properties thereof to be edited and all of the commands possible for the current context to be accessed, the commands being displayed in a central display panel (402 in FIG. 4, 502 in FIG. 5a).

Advantageously, the design of the FMD interface allows an interaction with an activatable symbol of the third region 306 to generate construction of a first horizontal-navigation sub-level and display, in a fourth region, of a set of optionally activatable symbols. The symbols displayed for the first horizontal-navigation sub-level are representative of navigation commands or functions associated with the activated symbol in the third region, these commands or functions being determined by the one or more processors of the flight management system and of the FMD application for the current context of the aircraft (collection of current data, analysis and processing).

In one embodiment, construction of the first navigation sub-level decreases the perimeter or display area of the third region to a vertical band and allows an editing panel to be displayed in a fourth region beside the vertical band. This editing panel is contextual and corresponds to all of the possible options relating to the selected symbol.

In one embodiment, an FMD interface may be available to the pilot such that the display of the vertical band is on the left of the screen and the horizontal-navigation sub-level displayed to the right of the vertical band, and an FMD interface may be available to the co-pilot the display of which is a mirror display.

FIG. 4 illustrates one example of a first horizontal-navigation sub-level 402 generated via an interaction with a waypoint symbol of the sequential representation. In the example, the selected waypoint (MOPI) causes an editing panel 402 to open, the latter being displayed to the right of the vertical band of the small display of the third region.

The editing panel 402 shows on a first thumbnail ('AC-TIONS' greyed out in the figure) all of the possible actions relating to the selected waypoint.

The editing panel 402 shows under a second thumbnail all of the constraints on one point of the flight plan (altitude constraints, speed constraints, etc.). FIG. 5a illustrates one example of a constraint-editing panel 502 ('CON-STRAINTS' greyed out in the figure) actuated through interaction with the sequential display interface of a waypoint list;

Thus, the first horizontal-navigation sub-level makes it possible to display, in a fourth region, a panel from which it is possible to act on activatable symbols, in order for example to add elements to the flight plan (addition of a new waypoint, addition of an airway or of a holding pattern, addition of a procedure) or edit or modify a constraint.

Figure 5B:
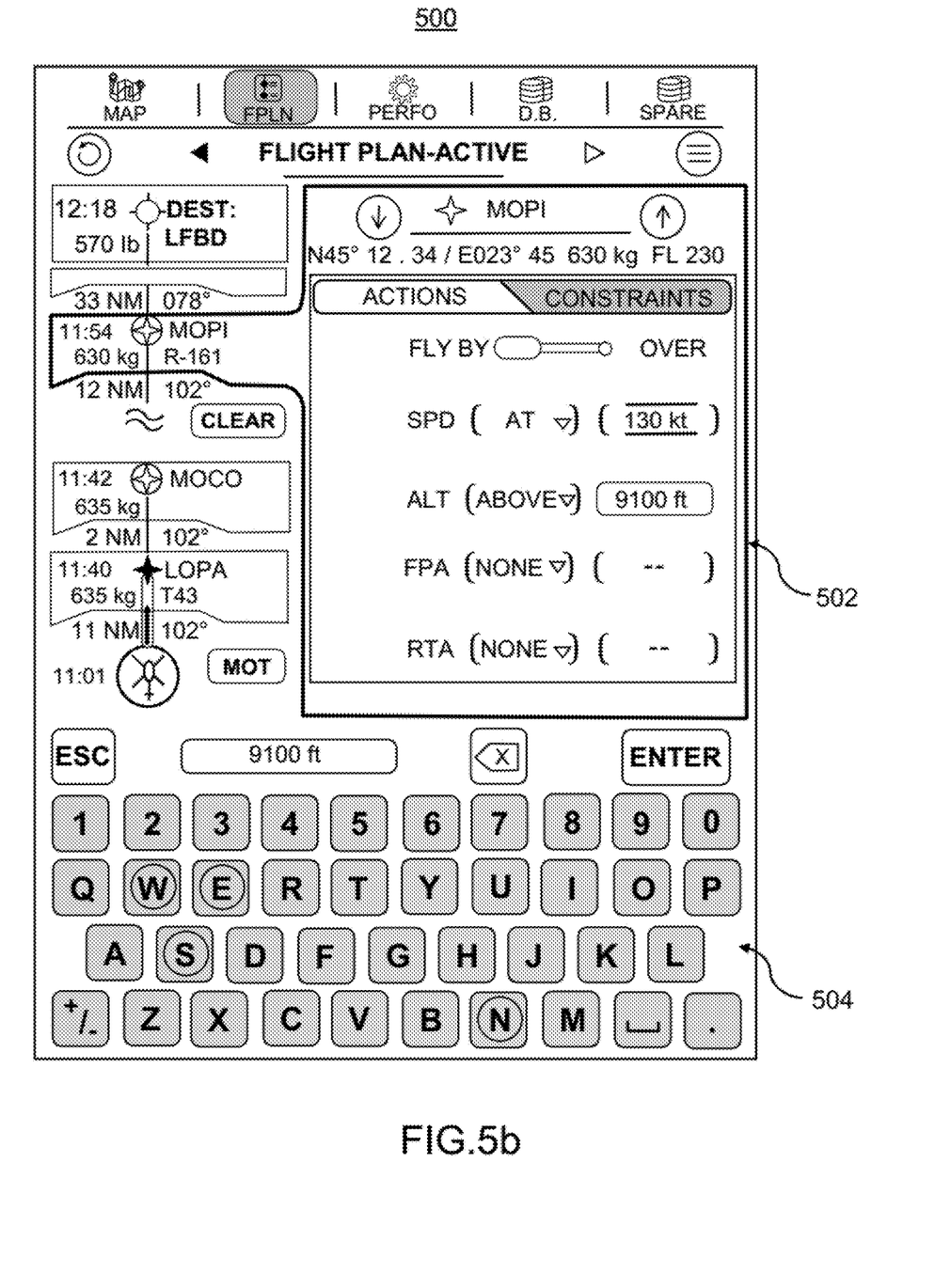
FIG. 5b illustrates an example of display, on the FMD interface of the invention, of a second horizontal-navigation sub-level actuated through interaction with the first-level interface of FIG. 5a, FIG. 6 illustrates one example of a display screen of a cockpit displaying various human-machine interfaces allowing centralized management of a flight mission using the device of the invention.

On interaction with an activatable symbol of the first horizontal-navigation sub-level, an editing menu 504 opens in a fifth display region, as illustrated in FIG. 5b. The editing menu allows data to be input as regards the function or command that was selected by the user.

The steps of the method of the invention that are implemented to obtain display of the various interfaces consist in:

detecting an interaction with an activatable symbol of the third region;

determining a display area in a fourth region of the screen that is in the perimeter of said third region, while preserving in this perimeter a display of some first-level information of the sequential representation;

displaying optionally activatable symbols in the fourth region of the screen, said activatable symbols being representative of navigation commands or functions regarding said activated symbol, said functions or commands being determined by the current context of the aircraft;

detecting an interaction with an activatable symbol of the fourth region;

determining a display area in a fifth region of the screen that is in the perimeter of said third region, while preserving in this perimeter a display of some first-level information of the sequential representation;

displaying an editing menu in a fifth region of the screen, said editing menu allowing data to be input in respect of the function or command selected via interaction with said symbol.

The method of the invention may be implemented on the basis of hardware and/or software elements. The method may be available as a computer program product on a computer-readable medium. The method may be implemented on a system potentially employing one or more dedicated electronic circuits or a general-purpose electronic circuit. The technique of the method according to the invention may be implemented on a reprogrammable computing machine (a processor or a microcontroller for example) executing a program comprising a sequence of non-transient instructions, or on a dedicated computing machine (for example a set of logic gates such as an FPGA or an ASIC, or any other hardware module). The various modules of the system according to the invention may be implemented on the same processor or on the same circuit, or be distributed to a plurality of processors or a plurality of circuits. The modules of the system according to the invention consist in computing means including a processor. The reference to a computer program that, when it is executed, performs any one of the functions described above is not limited to an application program running on a single host computer—it may rather be executed by a plurality of processors.

Advantageously, the device of the invention delivers an optimized display configuration, in that the area computed for the fourth display region and the area computed for the fifth display region are determined so that the respective displays fall within the perimeter of the third region, which preserves an optimized display of some first-level information of the sequential representation.

Advantageously, the device of the invention allows centralized management of a flight management system, via navigation through a horizontal tree, with only 2 navigation sub-levels, while preserving continual access to the first level at any time, thereby retaining the context of use. It is therefore very intuitive to understand and remember the gamut of possibilities.

Horizontal navigation to two sub-levels from a first level corresponding to selection of the flight-plan function has been described. However, a person skilled in the art will understand that this example is non-limiting and merely illustrative, and that the principle of two-sub-level horizontal navigation is applicable to any selected function or symbol, such as, for example, to selection of a symbol representative of a flight phase causing two horizontal navigation sub-levels to possibly open in the fourth and fifth display regions, respectively.

In addition, the device of the invention meets the certification constraint that must be met by on-board (software and hardware) avionic components, according to which it is necessary to employ a software architecture that is reversible in character, allowing the safety of actions to be ensured. To meet this constraint, the device of the invention is configured so that any action engaged by the user and that will have a significant effect on the progression of the flight plan (such as a decrease in the amount of fuel predicted to remain at the destination, a change in navigation procedure requiring authorization, etc.) perforce causes the display of a temporary new flight plan in a temporary state, which is indicated by a "warning" colour (yellow for example), so that the pilot can perform a check before validating his modifications, or else cancel the action.

In one embodiment, the device offers the possibility of returning to a state "n−1" with an undo button.

As indicated above, the FMD interface provides a plurality of display formats, including a panel format and a small format mainly intended to be displayed in complement to the HMI of a 2D map of the navigation system display NSD and/or the HMI of a terrain cross-section of the vertical system display VSD.

FIG. 6 illustrates one example of a control screen 600 of a cockpit displaying various human-machine interfaces allowing centralized management of a flight mission using the device of the invention.

Preferably, the control screens are touch screens and the primary means of interacting therewith is by touching the screen, but any other pointer-like mechanism (mouse, CCD, touchpad) may be used to interact with the various interfaces.

In the illustrated embodiment, the screen displays the FMD interface of the device of the invention 602, 604, 606 in the left-hand portion, an interface for display of a 2D map 608 in the top right-hand portion, and an interface for display of a vertical cross-sectional plane 610 at the bottom right.

The device of the invention is configured (i.e. it comprises a computing module with suitable code instructions) to allow a continuity of interaction between the various applications displayed on a given screen. For example, an action actuated by the pilot via the interface of the 2D map, such as positioning of a geo-referenced point, is detected and allows, in the corresponding editing menu of the FMD interface of the invention, this point to be edited so as to obtain information and/or input data.

In addition, the device is configured to allow an action to be initiated on the FMD interface, it to be continued on the interface of the 2D map and it to be terminated on the FMD interface. This continuity of interaction for example makes it possible to make a modification to a waypoint of the flight in respect of its sequencing and/or its position, and/or to modify constraints thereof.

The invention claimed is:

1. A device for centralized management of an aircraft flight management system, comprising:
    a data-processing module having a processor configured to implement code instructions allowing data of a flight management system of an aircraft to be processed; and
    a display module that interacts with the data-processing module, which is configured to display on a screen of the aircraft:
        in a first region of the screen, activatable symbols representing operations for management of the flight plan of the aircraft and operations for configuration of the flight management system of the aircraft;
        in a second region of the screen, activatable symbols representing contextual navigation functions associated with an activated symbol in the first region; and
        in a third region of the screen, a sequential representation of optionally activatable symbols representing first-level information, on the active flight plan of the aircraft, said first-level information including at least a list of successive waypoints of the flight plan, from the current position of the aircraft to the destination point, of immediate actions relating to the current position of the aircraft, and of future actions relating to positions of the aircraft at the successive waypoints;
    the device comprising the display module is configured to:
        detect an interaction with an activatable symbol of the third region;
        determine navigation commands or functions corresponding to said activated symbol depending on the current context of the aircraft; and
        display, in a fourth region of the screen, activatable symbols representing said navigation commands or said functions; and is configured to:
        detect an interaction with an activatable symbol of the fourth region of the screen;
        identify a function or command corresponding to the activated symbol; and
        display, in a fifth region of the screen, an editing menu for inputting data in respect of the function or command identified via interaction with said symbol;
    is configured to determine a display area for said fourth region of the screen and a display area for said fifth region of the screen that are such that the respective displays are generated in the perimeter of said third region of the screen while preserving, in this perimeter, a display of some first-level information of the sequential representation;
    and is configured, based on the interaction with an activatable symbol of the third region, to generate construction of a first horizontal-navigation sub-level configured to decrease the perimeter or display area of the third region to a vertical band and to allow an editing panel to be displayed in the fourth region beside the vertical band.

2. The device according to claim 1, wherein the display module comprises a module configured to display, in the second region of the screen, activatable symbols representing various flight phases of the aircraft, and to display, in the third region of the screen, a sequential representation of the waypoints of the flight plan of the aircraft, when an activatable symbol representing the flight plan of the aircraft is activated.

3. The device according to claim 1, wherein the display module comprises a module configured to compute a new display perimeter of the third region on an interaction with an activatable symbol of the third region.

4. The device according to claim 1, wherein the display module is configured to compute a display area of the third region according to three different display formats.

5. The device according to claim 1, wherein the display module is configured to compute a display area of the third region allowing full display in a format referred to as the 'full 660 px' format displaying all of the functionalities for managing the flight management system.

6. The device according to claim 1, wherein the display module is configured to compute a display area of the third region allowing display in a panel format referred to as the 'panel 400 px' format allowing combined display of activatable symbols on the same screen with a 2D map.

7. The device according to claim 1, wherein the display module is configured to compute a display area of the third region allowing display of non-activatable symbols in a strip format referred to as the 'strip 180 px' format allowing a display of small size.

8. The device according to claim 1, wherein the display module is configured to display the fourth region to the right or to the left of the display area preserved for first-level information.

9. The device according to claim 1, wherein the editing menu especially allows a new waypoint or a new procedure to be added, or a constraint on a point of the flight plan to be edited.

10. An electronic system for displaying a flight mission of an aircraft, configured to render, on the same screen:
   in a first region, what is referred to as a cartographic display of a 2D map with geo-referenced waypoints of the flight plan of the aircraft;
   in a second region, what is referred to as a vertical display of a vertical cross-sectional view of the terrain on the flight plan of the aircraft; and
   in a third region, a display of the flight plan obtained by the display module of the device according to claim 1.

11. The system according to claim 10, wherein the device comprises a module configured to determine an interaction with the first or second region and to actuate display of a corresponding editing menu in the third region.

12. An aircraft, comprising a flight management system and a device according to claim 1.

13. The aircraft of claim 12, the aircraft being a helicopter.

14. The device according to claim 1, wherein the fourth display region is determined so that the fourth display region falls within the perimeter of the third region.

15. The device according to claim 1, wherein the fourth display region and the area computed for the fifth display region are determined so that the respective displays fall within the perimeter of the third region.

16. A method for centralized management of an aircraft flight management system, comprising steps that are implemented:
   by a data-processing module having a processor configured to implement code instructions allowing data of a flight management system of an aircraft to be processed; and
   by a display module that interacts with the data-processing module, the display module being configured to display on a screen of the aircraft:
      in a first region of the screen, activatable symbols representing operations for management of the flight plan of the aircraft and operations for configuration of the flight management system of the aircraft;
      in a second region of the screen, activatable symbols representing contextual navigation functions associated with an activated symbol in the first region; and
      in a third region of the screen, a sequential representation of optionally activatable symbols representing first-level information, on the active flight plan of the aircraft, said first-level information including at least a list of successive waypoints of the flight plan, from the current position of the aircraft to the destination point, of immediate actions relating to the current position of the aircraft, and of future actions relating to positions of the aircraft at the successive waypoints;
   the steps of the method comprising:
      detecting an interaction with an activatable symbol of the third region of the screen;
      determining a display area in a fourth region of the screen that is in the perimeter of said third region, while preserving in this perimeter a display of some first-level information of the sequential representation;
      determining navigation commands or functions corresponding to said activated symbol depending on the current context of the aircraft; and
      displaying in the fourth region of the screen, activatable symbols representing said navigation commands or said functions;
      detecting an interaction with an activatable symbol of the fourth region of the screen;
      determining a display area in a fifth region of the screen that is in the perimeter of said third region, while preserving in this perimeter a display of some first-level information of the sequential representation;
      identifying a function or command corresponding to the activated symbol; and
      displaying, in a fifth region of the screen, an editing menu for inputting data in respect of the function or command identified via interaction with said symbol;
      and, based on the interaction with an activatable symbol of the third region, generating construction of a first horizontal-navigation sub-level configured to decrease the perimeter or display area of the third region to a vertical band and allowing an editing panel to be displayed in the fourth region beside the vertical band.

17. A non-transitory computer-readable storage medium comprising a computer program comprising code instructions allowing the steps of the method according to claim 16 to be performed, when said program is executed on a computer.

* * * * *